W. J. MUNCASTER.
SHAFTING MACHINERY.
APPLICATION FILED JUNE 27, 1906. RENEWED MAR. 9, 1912.
1,039,992.
Patented Oct. 1, 1912.
5 SHEETS—SHEET 1.
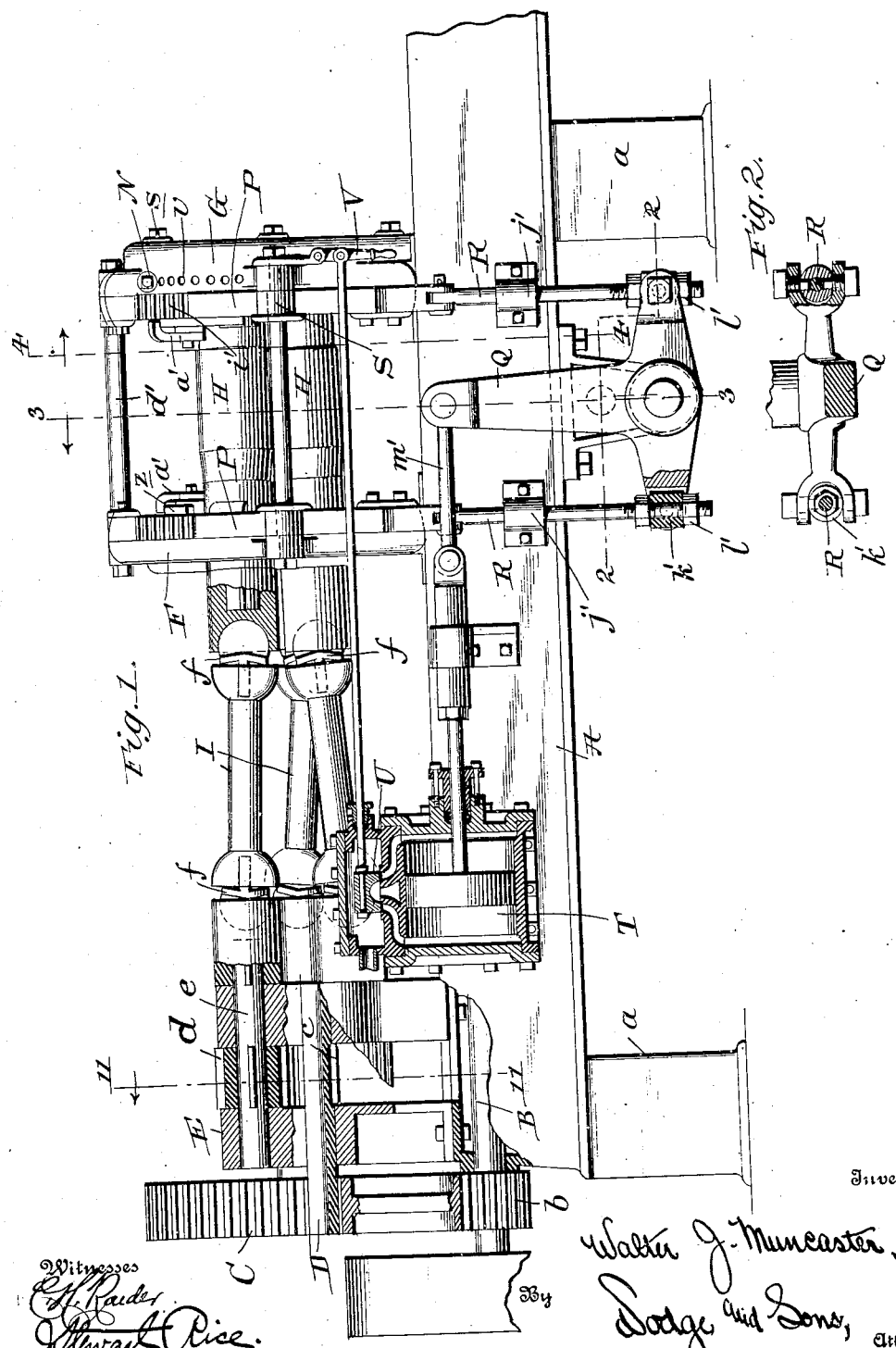

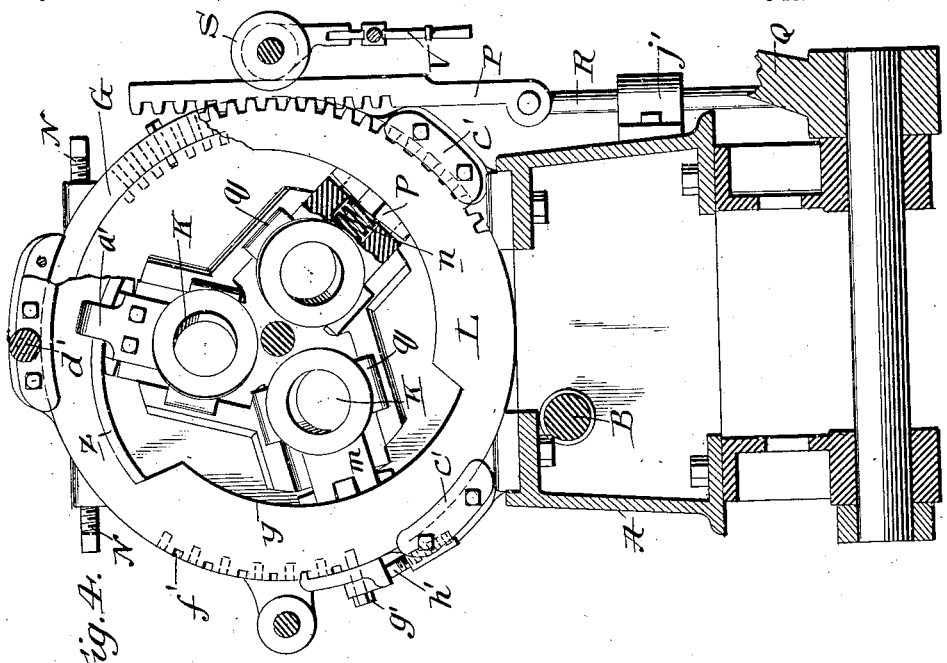
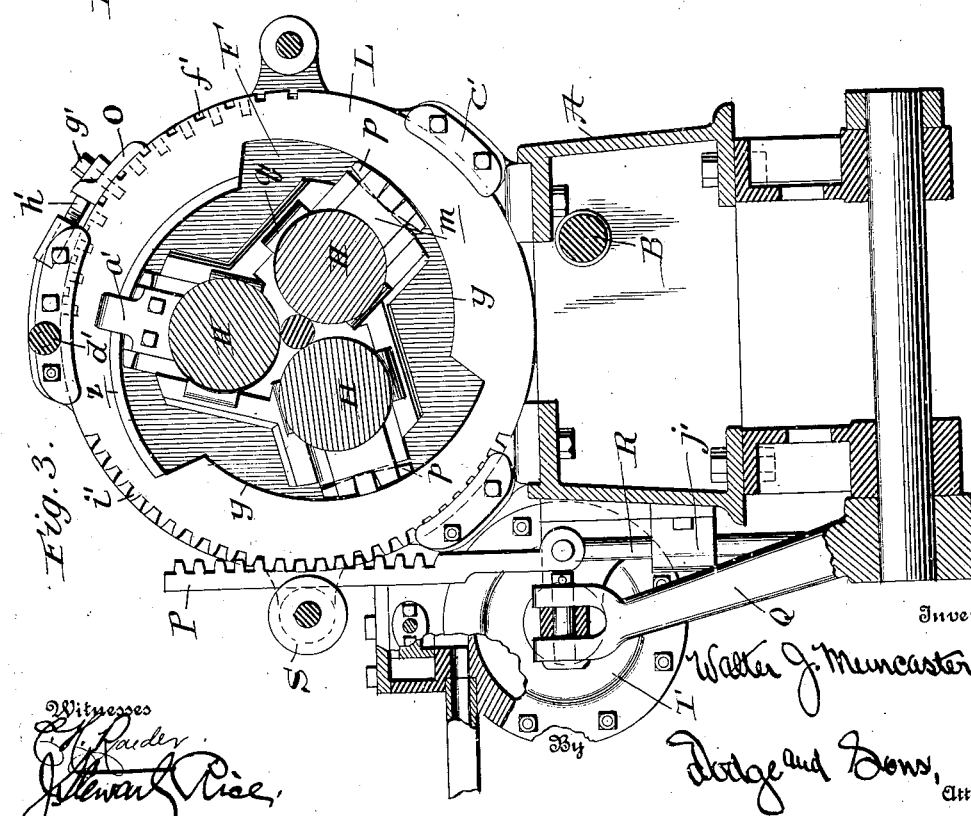

W. J. MUNCASTER.
SHAFTING MACHINERY.
APPLICATION FILED JUNE 27, 1906. RENEWED MAR. 9, 1912.
1,039,992.
Patented Oct. 1, 1912.
5 SHEETS—SHEET 3.
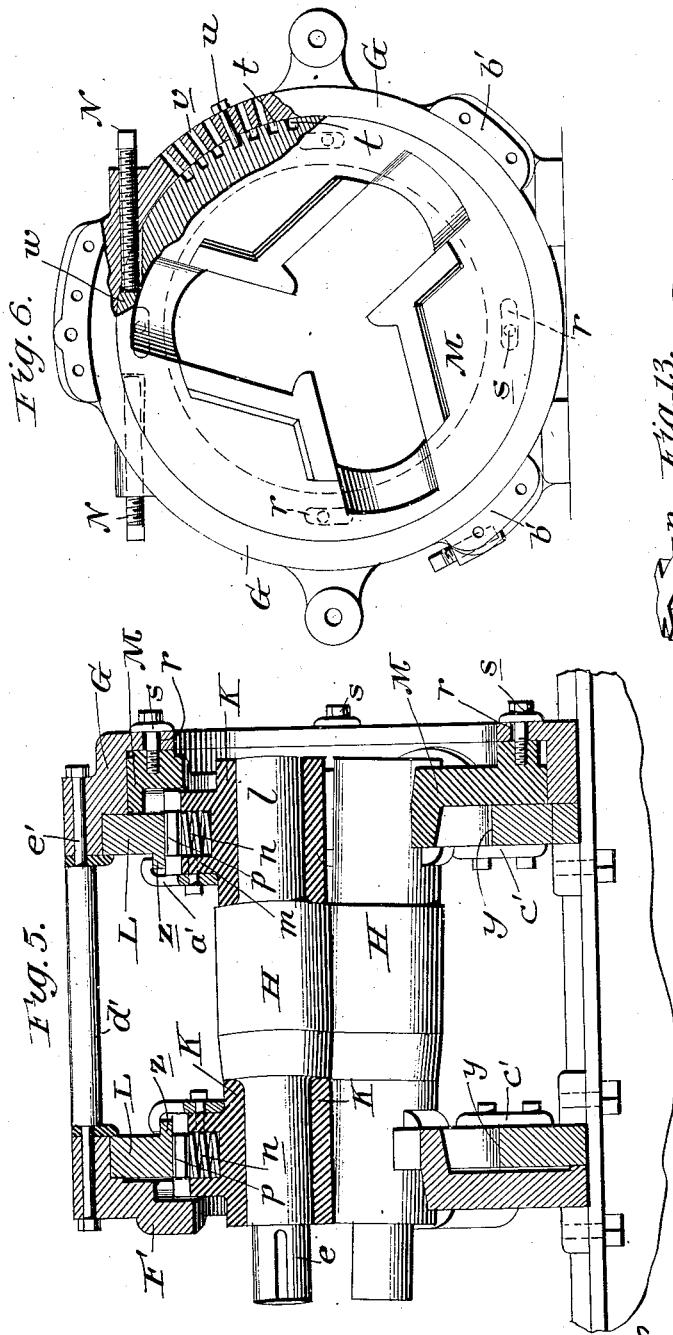
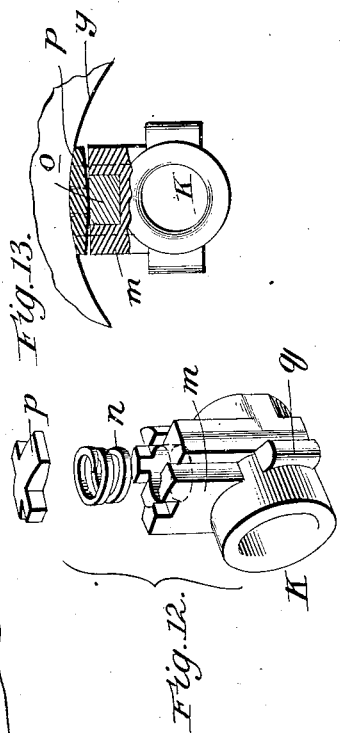
Inventor:
Walter J. Muncaster,
By Dodge and Sons,
Attorneys.
Witnesses W. J. MUNCASTER.
SHAFTING MACHINERY.
APPLICATION FILED JUNE 27, 1906. RENEWED MAR. 9, 1912.
1,039,992.
Patented Oct. 1, 1912.
5 SHEETS—SHEET 4.
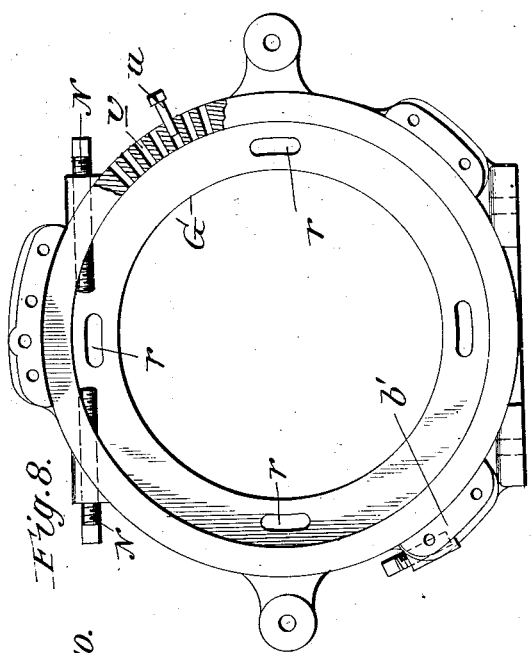
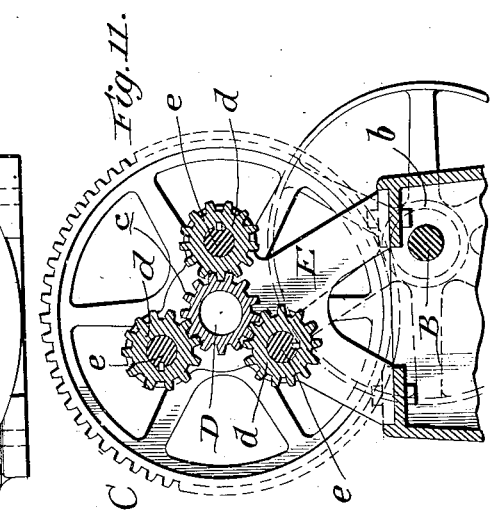
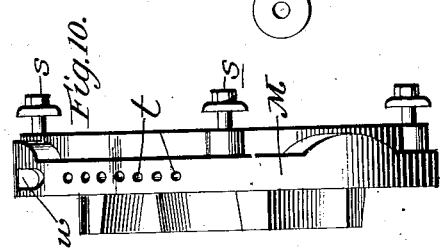
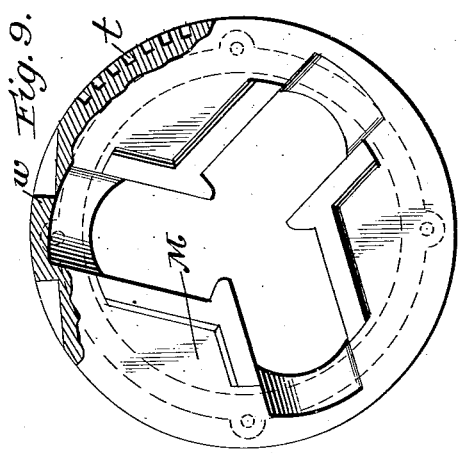
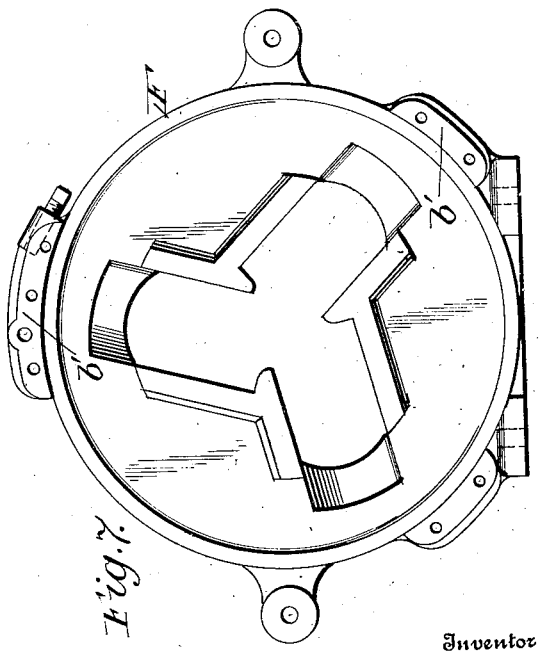
Inventor:
Walter J. Muncaster,
By Dodge and Sons,
Attorneys.

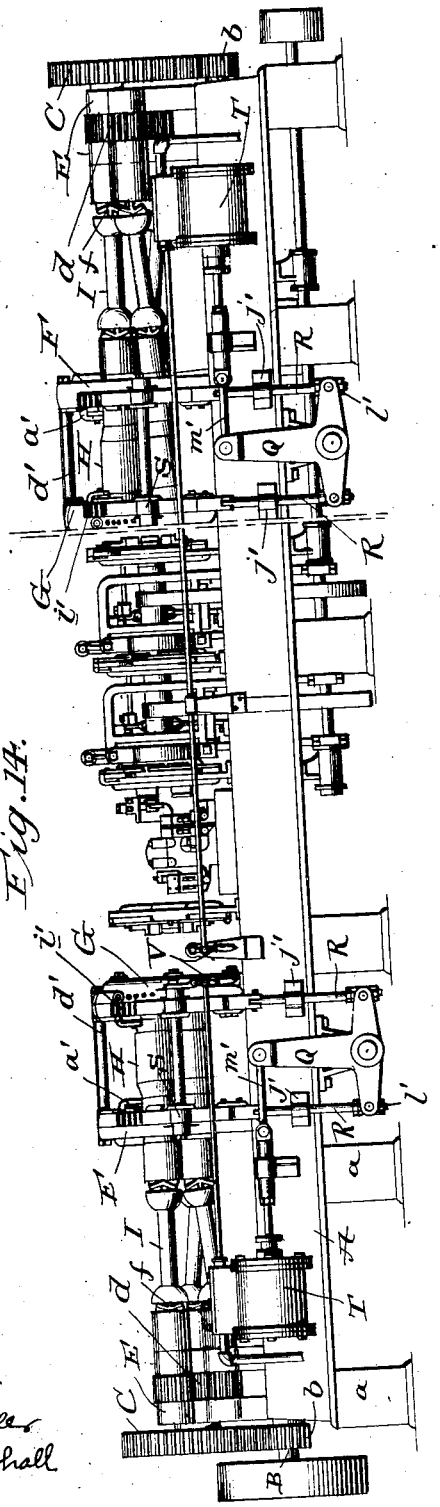

UNITED STATES PATENT OFFICE.

WALTER J. MUNCASTER, OF CUMBERLAND, MARYLAND.

SHAFTING MACHINERY.

1,039,992.

Specification of Letters Patent.

Patented Oct. 1, 1912.

Application filed June 27, 1906, Serial No. 323,702. Renewed March 9, 1912. Serial No. 682,755.

*To all whom it may concern:*

Be it known that I, WALTER J. MUNCASTER, a citizen of the United States, residing at Cumberland, in the county of Allegany and State of Maryland, have invented certain new and useful Improvements in Shafting Machinery, of which the following is a specification.

This invention pertains to feeding rolls for machinery for handling shafting and like cylindrical bodies, whether for straightening, gaging, or finishing, and the invention consists more particularly in novel means for securing proper adjustment of the rolls to suit bodies of different diameters.

In the accompanying drawings: Figure 1 is a partly sectional elevation of a stand of feeding rolls and their driving and adjusting mechanisms; Fig. 2, a section on the line 2—2 of Fig. 1; Fig. 3, a transverse section on the line 3—3 of Fig. 1; Fig. 4, a transverse section on the line 4—4 of Fig. 1, looking in the opposite direction, the rolls being omitted; Fig. 5, a longitudinal vertical sectional view of the roll housings; Fig. 6, an inner face view of the right-hand one of the housings of Fig. 5, partly in section; Fig. 7, an inner face view of the left-hand one of the housings of Fig. 5, the adjustable ring being omitted; Fig. 8, an elevation of the housing of Fig. 6, with the inner ring or guide-head removed; Fig. 9, a face view or elevation of said inner ring detached and partly in section; Fig. 10, an edge view of the same; Fig. 11, a transverse section on the line 11—11 of Fig. 1; Fig. 12, a perspective view of one of the journal boxes or bearings, with the bearing plate and spring detached; Fig. 13, a detail view, partly sectional, of one of the journal bearings employed for the rolls at the discharge end of the machine; Fig. 14, an elevation of the complete machine.

The mechanism about to be described is intended more particularly for feeding shafting into and out of machines for grinding, polishing, gaging or straightening it; but may be useful in other relations also. The objects sought are to facilitate the adjustment of the rolls toward and from the common axis about which they are grouped; to give to the rolls an initial obliquity or angularity to said axis, variable as required; to cause the degree of such obliquity to be changed automatically in proportion to the drawing together or spreading apart of the rolls, so that the rate of feed shall be made to suit the work in hand; and generally to strengthen, simplify, and render convenient the apparatus as a whole.

The mechanism here shown and described may be used at either or both ends of machinery such as mentioned, but is ordinarily used at both ends, with no substantial difference between the two sets. The description of one will therefore answer for both, with mention of the slight variation in bearings found expedient in practice.

A, in the drawings, indicates the bed or main frame of a machine for straightening or for gaging and finishing shafting, or performing like work, which bed is carried at intervals upon stools or supports $a$. Extending lengthwise of this bed, and carried in suitable bearings, is a driving shaft B, provided with a pinion $b$, from which motion is given to a large gear C, shown in Figs. 1 and 11. Gear C is carried by a tubular shaft D, the opening through which is of adequate size to permit the free passage of the largest shafting or other bodies to be handled by the machine. It is journaled in housings or standards E, bolted or otherwise secured upon bed or base A, and carries at a point between said housings a pinion $c$, which meshes with and gives rotation to three similar pinions $d$, keyed or otherwise made fast upon shafts $e$, journaled in the housings or standards E, and spaced at equal angular distances about tubular shaft D, as seen in Fig. 11.

At a distance from the housings or standards E are two other housings F and G, also mounted on the bed A, and in which are carried the journal boxes or bearings of three feeding rolls H, the rolls extending from housing to housing, and their journals being carried in the boxes mounted therein, as will be explained.

Connection is made between the shafts $e$ and rolls H through the medium of angling-shafts I and coupling pieces or wing-plates $f$, shown in one form in Fig. 1.

Each roll H has a journal $i$ at either end, and these journals are carried in boxes or sleeve bearings K, of the form shown in Figs. 5 and 12; that is to say, each comprises a sleeve, a radial tubular extension $m$ to receive a spring $n$, or, in the case of the delivery or discharge rolls, a bearing-block $o$ (Fig. 13), and a cruciform cap-plate $p$, the arms of which fit in seats formed in the outer end of the extension $m$. The sides of the extension $m$ constitute bearing and guiding faces to fit the guideways formed, respectively, in the housing F and in the swivel head M seated in the housing G, in which guideways the journal-boxes or bearings K are mounted, lugs $q$ serving to prevent the displacement of the sleeves or journal-boxes in an axial direction. This will be readily understood upon referring to Fig. 4, where the journal-boxes are shown in position in the head M.

The swivel head M and housing F are each formed with three guideways, obliquely or tangentially arranged with reference to the center or axis about which the guideways are set. The direction of inclination of the guideways in the housing and head is reversed, so that the axis of each roll shall be more or less oblique to that of the shafting passing between the rolls, or to what may be termed the axis of the work in the machine, which is coincident with the axis of the tubular shaft D. This will be understood upon referring to Figs. 3 and 4 when it is noted that, as indicated in Fig. 1, these sections are taken looking in opposite directions. When the parts are brought face to face the inclination instead of being as it appears in these figures, in like direction, will be seen to be in opposite directions.

It will be observed that the three rolls H are arranged with the two lower ones in a common horizontal plane, or substantially so, while the third is above and between the first two. Under this arrangement the journals of the lower rolls tend to move backward in their guideways by gravity when free so to move, but the upper roll requires to be positively retracted when the rolls are to be spread apart.

The swivel head M is turned true and is nicely fitted in the housing G, so that although it may be partially rotated therein, it shall not cease to be truly concentric therewith. It will be understood that by turning the swivel head M in its housing, the obliquity of the rolls H to the common work axis may be varied.

The angularity of the rolls, as just noted, is changed as they are moved toward and from the center, and while this angularity causes the feed to remain substantially constant for shafting of a large range of diameters, in the smaller sizes the feed becomes too fine. To overcome this difficulty, and also to adjust the rolls to any angularity or feed, I make the head M adjustable.

Referring to Figs. 5, 6, 8, 9 and 10, it will be seen that the housing G is provided with a series of slots $r$ in its outer or vertical wall, these slots being curved concentrically with the axis or center of the housing, and as best shown in Figs. 5 and 10, the swivel head M is tapped to receive bolts $s$, which, passing through the slots $r$, enter the holes or seats in the head M and draw it into its seat in the housing and hold it close against the vertical face or end wall thereof. They may serve also to clamp or bind the head M, though this is not essential, as other provision is made for holding the head. This will be seen in Fig. 6, where the periphery of the head M is shown provided with a series of holes or sockets $t$ to receive the end of a pin $u$, which is passed through holes $v$ in the circumferential wall of the housing G. When the head M is brought to its proper position the pin $u$ is passed through one of the outer holes and seated at its inner end in one of the sockets $t$. The spacing of the sockets $t$ and holes $v$ is made slightly different, so that one or another of the sockets will register with one or another of the holes under the very slight variations of adjustment that can be made within the limited range permitted.

For the purpose of turning the head M in its housing G, two screw-stems N are passed through bosses formed on the upper side of the housing, their inner ends being arranged to bear on opposite sides of a lug $w$ formed by recessing or cutting away a portion of the circumference of the head M, as shown in Figs. 6 and 9. By backing one screw and advancing the other, head M may be rotated a short distance in either direction, the limit of such motion being equal to the length of the slots $r$, less the diameter of the bolts $s$. The pin $u$ guards against any shifting of the head M by reason of vibration of the machine, which might tend to cause a turning or backing of screws N.

For the purpose of effecting adjustment of the journal-boxes K and rolls H toward and from the common work axis, the housings F and G are each provided with a rotatable cam-ring L, the circumference of which is the same as that of the housings, and on the interior of which are formed three cams $y$, each of which bears upon a cap-plate $p$ of one or another of the journal-boxes K, as seen in Figs. 3 and 4. The cams are of like form and bear like relation to the common axis, hence if the cam-ring be turned in direction to bring the portion of shorter radius against the cap-plates, the journal-boxes and rolls will be simultaneously and equally moved inward; and if the ring be turned in the reverse direction the boxes and rolls will be permitted to move outward. The upper roll and its journal-boxes require to be moved positively outward because gravity tends to move them inward, hence the uppermost cam $y$ of each ring L is formed with a projecting rib $s$ of uniform width or thickness and parallel with the face of the cam, and the upper journal-box K is furnished with a hanger-plate $a'$, the laterally bent upper end of which overhangs the rib $s$, as shown in Figs. 1, 3, 4 and 5, and causes the upper journal-box to move outward as the ring is turned to bring the portion of the cam of greater radius over said box. The springs $n$ give a slightly yielding support to the boxes and their rolls, which prevents injury to the rolls in the event that any excessive irregularity of the shafting enter between them.

The cam-rings are retained in position and kept concentric with the housings F, G by forward or outward extensions $b'$ of the housings, curved to fit accurately the circumference of said rings, and by retaining plates $c'$, bolted thereto, as seen in Figs. 3, 4 and 5. The two housings are braced or stayed at their tops and sides by tubular members or spacers $d'$ and bolts $e'$, Figs. 1 and 5.

The rolls H require to be separated for the convenient introduction or entrance of the shafting or body to be operated upon, and to be drawn inward to bear properly thereon. It is unimportant to what extent they be separated, provided they freely admit the work, but it is important that they be not permitted to approach closer than they should because they might in such event exert undue pressure upon and injure the work. Accordingly, I provide means for accurately limiting the rotation of the cam-rings in the closing direction. This will be seen in Figs. 3 and 4, where the rings L are shown provided with peripheral notches $f'$ to receive the tail or laterally bent end of a stop-block O, secured upon the periphery of the ring by a bolt $g'$, there being a series of bolt holes corresponding in number with the notches $f'$, so that by removing the bolt the tail or end of the block O can be set in any notch and the block then secured by the bolt. The inturned end of the block directly receives the strain or pressure when the block encounters a coacting stop $h'$, while the bolt retains the block in place. The stop $h'$ is preferably a threaded stem or bolt, screwed into one of the lugs or extensions $b'$ and standing in the path of the block. Being threaded, it can be turned in or out to make finer adjustments than can be made by shifting the block from notch to notch.

It is important in machinery of this character to be able to control its various parts or elements from a single point, and it is necessary to move in or out simultaneously the journal-boxes at the two ends of the rolls H. For the purpose of rotating the rings L to effect this movement, I form in the periphery of each a series of gear teeth $i'$, and arrange a rack-bar P to mesh with the teeth of each, said rack-bars being actuated by a suitable motor, as presently explained.

Owing to the reversed inclination of the guideways in which the journal-boxes K move, the cams of the two rings L are similarly reversed; hence, to produce like effects the rings require to be turned in opposite directions and therefore the racks P are arranged to move simultaneously and equally in opposite directions. This is conveniently done by connecting the racks to opposite ends of the horizontal member of a T-shaped lever Q, fulcrumed at the meeting-point of the horizontal and vertical arms, as seen in Fig. 1. Connection is made between the rack-bars P and the arms of lever Q through the medium of rods R, pin-jointed to the rack-bars, extending down through guides $j'$, and finally passing through blocks $k'$, pivotally supported in the forked ends of the lever arms, as shown in Figs. 1 and 2. The lower ends of the rods R are screw-threaded, and furnished with nuts $l'$ above and below the pivot-blocks, permitting either rack-bar to be adjusted higher or lower with reference to the other, so as to give the proper relative movements of the two rings L.

To facilitate the initial setting of the rings and racks, the racks are held in mesh with the teeth of the rings by flanged rollers S, carried on one of the tie-rods which connect the housings F, G. By sliding the flanged rollers on the tie-rod out of line with the rack-bars, the rack-bars can be swung away from the rings, and permitting the latter to be turned to proper position, after which the rack-bars are swung back to meshing position, and the rollers are restored to place.

The lever Q has its upright member connected by a link or rod $m'$ with the piston-rod of a fluid-pressure motor T, here represented as an ordinary double-acting steam engine with a slide valve U which can be set by a hand lever V to admit steam to either end of the cylinder at will, or to cut off steam therefrom, the valve being shown in its medial or cutting-off position in Fig. 1. When the rolls are employed for finishing shafting, I preferably make them of the contour best shown in Fig. 5, that is, with the infeeding end slightly tapering. This formation of the rolls produces a slight drawing action, and by raising or lowering one end of the rolls, I am enabled to put the proper bearing on the rolls and shaft, to secure the desired action of rounding the shaft and also impart to the shaft a highly polished surface.

Having thus described my invention, what I claim is:

1. In combination with a suitable framework having a housing adapted to receive a circular head, a circular head seated in said housing and adapted to be turned a limited distance therein, said head being provided with guideways tangential to a circle concentric with its axis; a second housing secured to the main frame and having guideways arranged tangentially to a circle concentric with the axis of the housing, but inclined in a direction the reverse of that of the guideways of the circular head; journal boxes carried in the respective guideways; rolls grouped about the axis of the housings and having their journals carried in said journal boxes; and screws passing through threaded openings in the first-mentioned housing and bearing on opposite sides of a lug on said circular head, and serving both to circularly adjust, and to hold at any desired adjustment, the said head.

2. In combination with a housing having guideways tangential to a circle concentric with its axis; a second housing; a head swiveled in the second housing and provided with guideways of similar tangential arrangement but reversed as to their inclination; journal boxes mounted in the several guideways; rolls having their journals mounted in said boxes; and screws carried by the second housing and arranged to bear against opposite faces of a lug on the swiveled head, whereby they are adapted to serve as gages for adjustment of the head, to move said head, and to hold it at any desired adjustment.

3. In combination with two housings, one having guideways tangential to a circle concentric with the common axis of the two housings; a head swiveled in the other housing and provided with like guideways, the inclination of one set of guideways being the reverse of that of the guideways of the other set; journal boxes carried in said guideways; rolls having their journals mounted in said boxes; cam rings having a cam for and arranged to bear upon each journal box and adapted to be turned to move said boxes in their guideways, one of said cam rings being mounted upon and rotatable with the swiveled head, and provided on its periphery with gear teeth; and a rack bar carried upon the fixed frame of the machine for rotating said cam ring, adapted to be engaged and disengaged with and from the teeth of the ring, to permit said ring to rotate with the swiveled head without affecting the radial adjustment of the boxes carried by said head.

4. In combination with housing F provided with guideways, journal boxes K mounted in said guideways; a cam ring L arranged to bear upon and adjust said boxes; fixed or stationary housing G; swivel head M mounted in said housing and provided with guideways; journal boxes K mounted in said guideways; cam ring L arranged to bear upon and adjust said boxes; and screws carried by the housing G and arranged to bear against opposite faces of lug $w$ of the head M for turning the same.

5. In combination with housings F and G and swivel head M mounted in housing G, housing F and head M being both provided with guideways; journal-boxes mounted in said guideways; cam rings L carried by the housings and arranged to act upon and adjust the boxes; rack-bars meshing with teeth of the cam rings; a lever having arms on opposite sides of its fulcrum; connections between the respective rack-bars and the lever-arms; and a motor connected with and serving to oscillate said lever.

6. In combination with two housings, one having guideways tangential to a circle concentric with the common axis of the two housings, a head swiveled in the other housing and provided with like guideways; journal boxes carried in said guideways; rolls having their journals mounted in said boxes; cam rings encircling and serving to radially adjust said boxes, said cam rings being provided with gear teeth; a lever; pivot blocks carried by oppositely extending arms of said lever; rack bars meshing with the teeth of the cam rings; rods jointed to the racks, one to each, and passing through the pivot blocks of the lever arms; and nuts screwed upon said rods above and below the pivot blocks.

7. In combination with housings F, G, having guideways; journal-boxes mounted in said guideways; rolls having their journals mounted in said boxes; cam rings carried by the housings and serving to adjust the journal-boxes toward and from the common axis about which the rolls are grouped; stop-blocks adjustably secured upon the cam rings; and threaded stops screwing into the housings to engage with the stop-blocks; whereby the stopping points may be nicely determined.

8. In combination with housings F, G, having guideways; journal boxes mounted in said guideways; rolls having their journals mounted in said journal boxes; cam rings carried by the housings, and serving to adjust the journal boxes toward and from the common axis about which the rolls are grouped; mechanism for simultaneously turning said cam rings to adjust the journal boxes at both ends of the rolls; stop blocks carried by the cam rings; and stops on the housings serving to engage the stop blocks of the cam rings, whereby the rolls may be radially separated to receive the work, and may be promptly returned to definite working positions determinable by engagement of the stops.

In testimony whereof I have signed my name to this specification in the presence of two subscribing witnesses.

WALTER J. MUNCASTER.

Witnesses:
 ALBERT CHARLES,
 J. F. STARK.